United States Patent [19]

Berthold et al.

[11] Patent Number: 5,020,379
[45] Date of Patent: Jun. 4, 1991

[54] MICROBEND FIBER OPTIC STRAIN GAUGE

[75] Inventors: John W. Berthold, Salem; Stuart E. Reed, Homeworth, both of Ohio

[73] Assignee: The Babcock & Wilcox Company, New Orleans, La.

[21] Appl. No.: 94,580

[22] Filed: Sep. 9, 1987

Related U.S. Application Data

[63] Continuation-in-part of Ser. No. 924,962, Oct. 30, 1986, abandoned.

[51] Int. Cl.$^5$ .............................................. G01L 1/24
[52] U.S. Cl. ................................................... 73/800
[58] Field of Search ................. 73/800, 766, 705, 708; 356/32, 33, 34; 350/96.1, 96.15, 96.16, 371; 250/227

[56] References Cited

U.S. PATENT DOCUMENTS

| | | | |
|---|---|---|---|
| 4,021,896 | 11/1986 | Lagakos et al. | 350/96.3 |
| 4,163,397 | 8/1979 | Harmer | 73/800 |
| 4,342,907 | 8/1982 | Macedo et al. | 73/800 |
| 4,407,561 | 10/1983 | Wysocki | 73/295 |
| 4,436,995 | 3/1984 | Whitten | 250/227 |
| 4,477,725 | 10/1984 | Asawa et al. | 73/800 |
| 4,487,206 | 12/1984 | Aagard | 73/705 |
| 4,495,819 | 1/1985 | Tekippe | 73/800 |
| 4,530,078 | 7/1985 | Logakos et al. | 73/855 |
| 4,560,016 | 12/1985 | Ibanez et al. | 73/800 |
| 4,577,100 | 3/1986 | Meltz et al. | 73/800 |
| 4,592,932 | 6/1986 | Biswas et al. | 65/3.11 |
| 4,733,933 | 3/1988 | Pikulski | 250/277 |

FOREIGN PATENT DOCUMENTS

| | | |
|---|---|---|
| 0027540 | 4/1981 | European Pat. Off. . |
| 79/00377 | 6/1979 | PCT Int'l Appl. . |
| 2125161 | 2/1984 | United Kingdom . |

Primary Examiner—Robert Raevis
Attorney, Agent, or Firm—Vytas R. Matas; Robert J. Edwards; Daniel S. Kalka

[57] ABSTRACT

A microbend strain gauge comprises a pair of plates having facing offset corrugations which clamp a signal optical fiber therebetween. The optical fiber is coated and a light signal is supplied to one end of the fiber which is read at an opposite end of the fiber by an optical sensor. Modulations in the light are primarily due to a difference in pressure being applied to the fiber by the plates. A second optical fiber, is subjected to the same thermal condition and its light signal compared to the light signal through the signal optical fiber to offset any temperature error introduced into the signal by changes in temperature. Aluminum, polyimide or gold coating increases temperature resistance for the fibers.

4 Claims, 4 Drawing Sheets

MICROBEND FIBER OPTIC STRAIN GAUGE

This application is a continuation-in-part of application Ser. No. 06/924,962, filed Oct. 30, 1986, co-pending at the time this application was filed, but now abandoned.

FIELD AND BACKGROUND OF THE INVENTION

The present invention relates in general to strain gauges, and in particular to a new and useful microbend fiber optic strain gauge which utilizes a coated optical fiber held and bent between corrugated plates, and a reference optical fiber which is exposed to the same thermal and other conditions but which is not held between the corrugated plates.

Strain gauges have been developed to measure structural loads to verify proper design of both individual components and the overall structure. Strain gauges now include foil, thin film, or wire resistance devices which are bonded or welded to the test piece to be measured. Loads applied to the test piece can cause it and the bonded gauge to extend, compress, or twist. The resulting strains induced in the gauge change its resistance. The gauge resistor forms one leg of a Wheatstone bridge. The bridge becomes unbalanced and a voltage developed in proportion to the amount of strain induced in the gauge. This approach is the basis of most strain gauge measurements performed today.

Difficulties are encountered when strain measurements are made at elevated temperatures, i.e. above 315° C. For example, differential expansion between the gauge and test piece induces strain in the gauge, using up a substantial portion of its range and masking the load-induced strain to be measured. Furthermore, for accurate and reliable measurement, resistance strain gauges are generally limited to temperatures below about 315° C. (about 600° F.). Above this temperature, physical and metallurgical effects such as alloy segregation, phase changes, selective oxidation and diffusion result in large non-repeatable and unpredictable changes in the gauge output, and often in premature failure of the gauge or leadwire system.

Currently, no satisfactory method exists to perform accurate and reliable strain measurements at temperatures exceeding about 315° C. A reliable, stable strain gauge is needed that will work at these elevated temperatures and which will match the thermal expansion of the test piece to enable the gauge to be bonded at low temperatures.

The measurement of the elongation of a structural member such as a long strut, presents several problems similar to those encountered in strain measurement. In a relatively benign environment which is free of vibration, the elongation may be slowly varying with time. This situation requires that an elongation sensor be capable of essentially D.C. measurements. As a consequence the sensor must exhibit extremely low drift.

This is further complicated when the structural member is in a hostile environment.

Instrumentation for in-flight monitoring of inlet and outlet engine conditions is needed for high-performance aircraft to improve fuel efficiency, engine performance, and overall reliability. This instrumentation must withstand the hostile engine environment which includes the high-temperature operating conditions and vibrations. Optical fibers and optical sensing methods have been applied to a number of measurements in hostile environments including displacement, velocity, strain, flow, temperature, particle size distribution, gas composition and fluorescence. These optical sensing methods can also be used to measure pressure in the hostile environment.

Optical sensors can also be designed to operate at high temperatures and in regions of high electromagnetic fields.

SUMMARY OF THE INVENTION

The present invention is drawn to a strain gauge which utilizes a pair of corrugated plates having corrugations that face each other and which are offset with respect to each other, and includes a coated optical fiber engaged between said facing corrugated surfaces and bent by said corrugations by amounts which depend on a biasing force pushing the plates together, whereby light moving through the optical fiber is modulated depending on the amount of pressure applied to the plates.

One aspect of the invention is to include, as part of the strain gauge, an additional optical fiber which is identical in construction to the first mentioned optical fiber but which is not engaged between the plates, the second optical fiber being near the first mentioned optical fiber so as to be exposed to the same temperature condition, light passing through and being modulated by the second optical fiber being used in conjunction with the light passing through and being modulated by the first mentioned optical fiber to produce a thermomechanical offset correction value. The second optical fiber, i.e. the reference fiber, provides a reference signal which may be used to compensate for light source fluctuations and vibrations which affect signals in both fibers about equally. Since transmission occurs through continuous fiber loops, no light is allowed to exit the fiber at the sensor location as taught, for example, in Aagard (U.S. Pat. No. 4,487,206). With the present invention, then, the sensor can be located in hostile environments. Further, long-term drift and offset errors caused by fiber end-face transmission or reflectivity changes are eliminated.

By coating a glass optical fiber with aluminum or polyimide, a strain gauge which is useful up to about 427° C. (about 800° F.) is obtained. By coating the glass fiber with gold, the useful temperature range can be expanded up to about 540° C. (about 1000° F.). These "buffer" coatings provide mechanical protection for the fiber core and cladding and also act as a barrier against water vapor which can cause microcracks.

Another aspect of the present invention is to provide a strain gauge which is simple in design, rugged in construction and economical to manufacture, and one which can withstand severe environmental conditions.

The various features of novelty which characterize the invention are pointed out with particularity in the claims annexed to and forming a part of this disclosure. For a better understanding of the invention, its operating advantages and specific results attained by its uses, reference is made to the accompanying drawings and descriptive matter in which preferred embodiments of the invention are illustrated.

DESCRIPTION OF THE PREFERRED EMBODIMENTS

Figure 1:
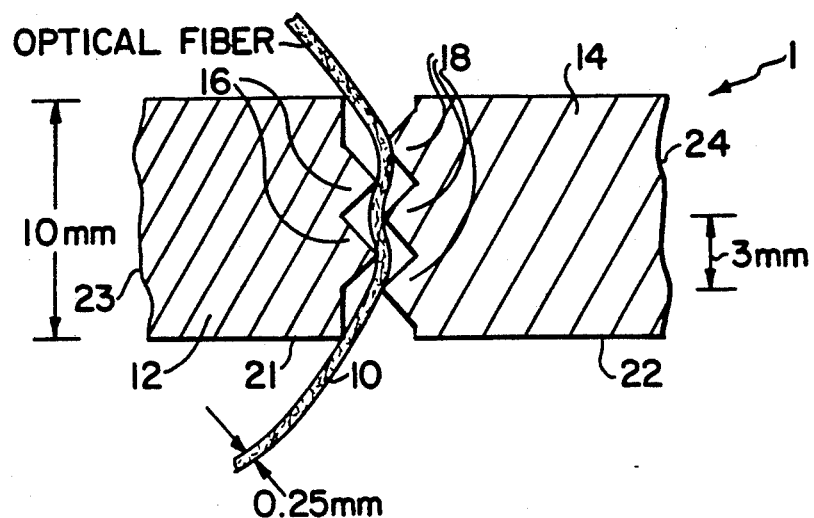
FIG. 1 is a side view in section showing the strain gauge of the present invention in its simplest form.

A microbend fiber optic strain gauge 1 is diagrammed in FIG. 1. A glass-on-glass optical fiber 10 is used with the following nominal characteristics:

Core diameter: 125 $\mu$m;
Clad diameter: 170 $\mu$m;
Numerical aperture: 0.2;
Buffer coating: 40 $\mu$m thick aluminum or polyimide; and
Overall diameter: 250 $\mu$m.

where 1 $\mu$m = $10^{-6}$ meters.

Figure 3:
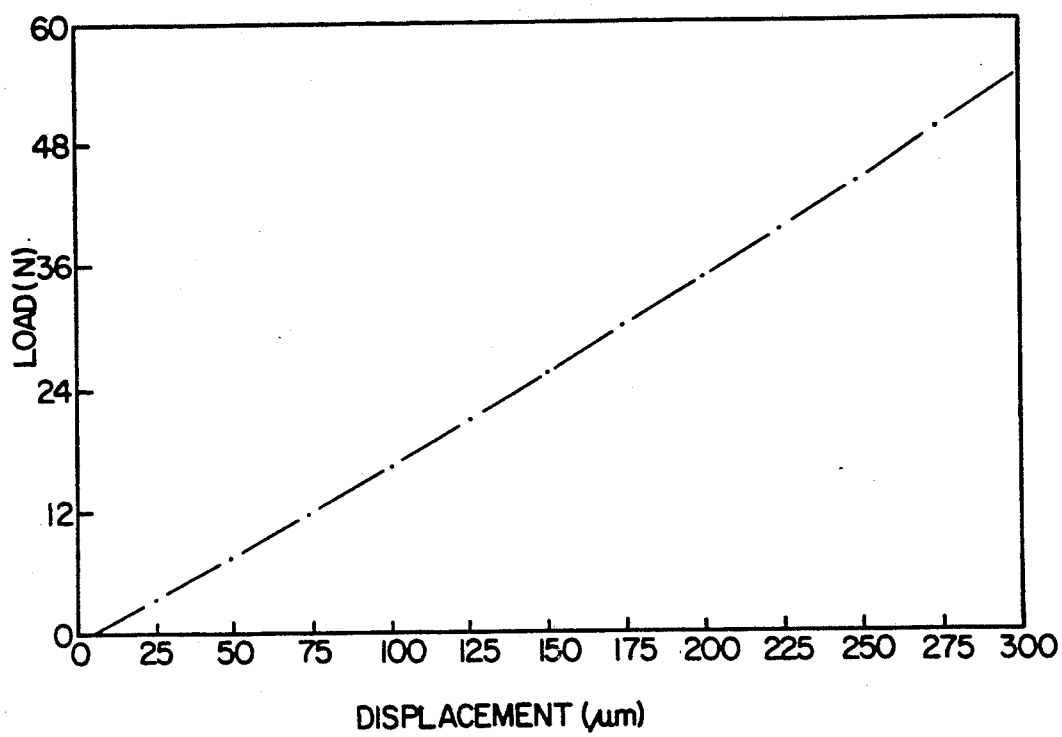
FIG. 3 is a graph plotting load versus displacement for the optical fiber of the invention with two spatial bends.

Fibers with the mentioned coatings are strong and rugged with tensile strengths exceeding 100,000 psi. The microbend sensor is a light intensity sensor, and as such, uses simple opto-electronic components. The strain gauge comprises the above fiber 10 clamped between corrugated plates 12 and 14 made from material identical to that of a test piece. Changes in strain of the test piece change the plate separation and in turn the light intensity transmitted at the point of clamping. The corrugation spacing is about 3 mm. Two corrugations 16 are on one plate 12 and three corrugations 18 are on the opposite plate 14 to provide two spatial sinusoidal bends in the fiber 10. The fiber is preloaded (bias compression) between the plates such that the peak-to-peak fiber bend amplitude is approximately 300 $\mu$m. In this configuration the sensitivity and repeatability of a microbend sensor as measured by peak-to-peak fiber bend amplitude has been demonstrated to be 0.005 $\mu$m. At these preloads the change in corrugated plate displacement with load is very nearly linear as shown in FIG. 3. Also note from FIG. 4 the microbend sensor linearity of output signal versus displacement of the corrugated plates.

Figure 5:
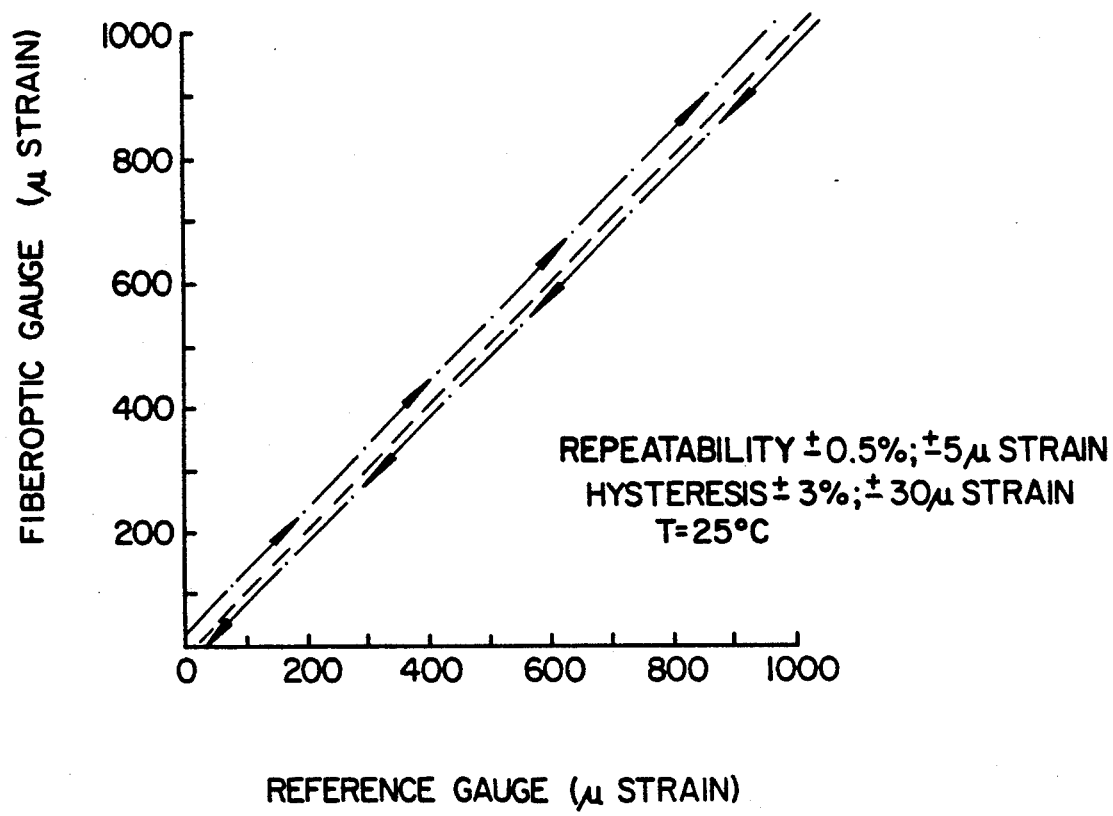
FIG. 5 is a graph showing calibration of the microbend strain gauge of the present invention relative to a reference gauge.

Performance data has been obtained on the microbend fiber optic strain gauge and is shown in FIG. 5. The microbend strain gauge was calibrated relative to a reference gauge.

Figure 6:
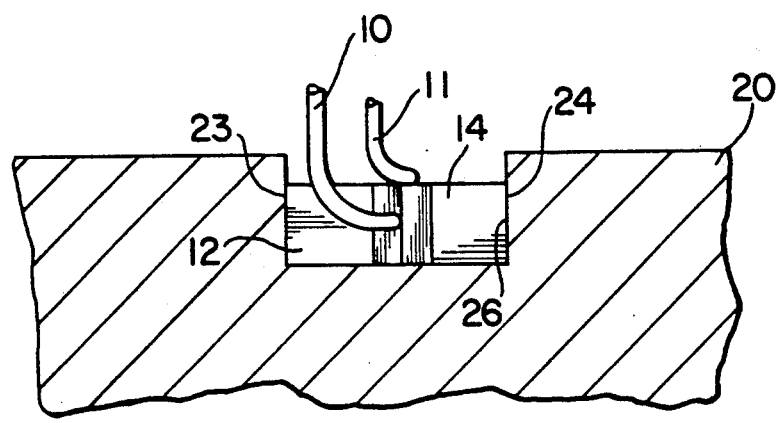
FIG. 6 is a side view in section showing the strain gauge of the present invention in a slot formed in the surface of a test piece whose strain is to be measured.

The microbend sensor plates 12 and 14 may be attached to the test piece in several different ways. These include welding or gluing the ends 21 and 22 to the surface of the test piece. A less obtrusive method would be to slot the surface and insert the plates into the slot. FIG. 6 shows a test piece 20 with slot 26 in which plates 12 and 14 are engaged. The plates are urged toward each other by their back surfaces 23 and 24. The method of attachment will be chosen to minimize alterations in the test piece structural properties and static and dynamic response.

Accelerated dynamic life tests have been performed on the microbend sensor and have demonstrated lifetime in excess of one million cycles with peak displacements of 25 $\mu$m. These tests were performed at 20 kHz cycling frequencies, which also demonstrated the high frequency response capability of the microbend sensor.

Figure 2:
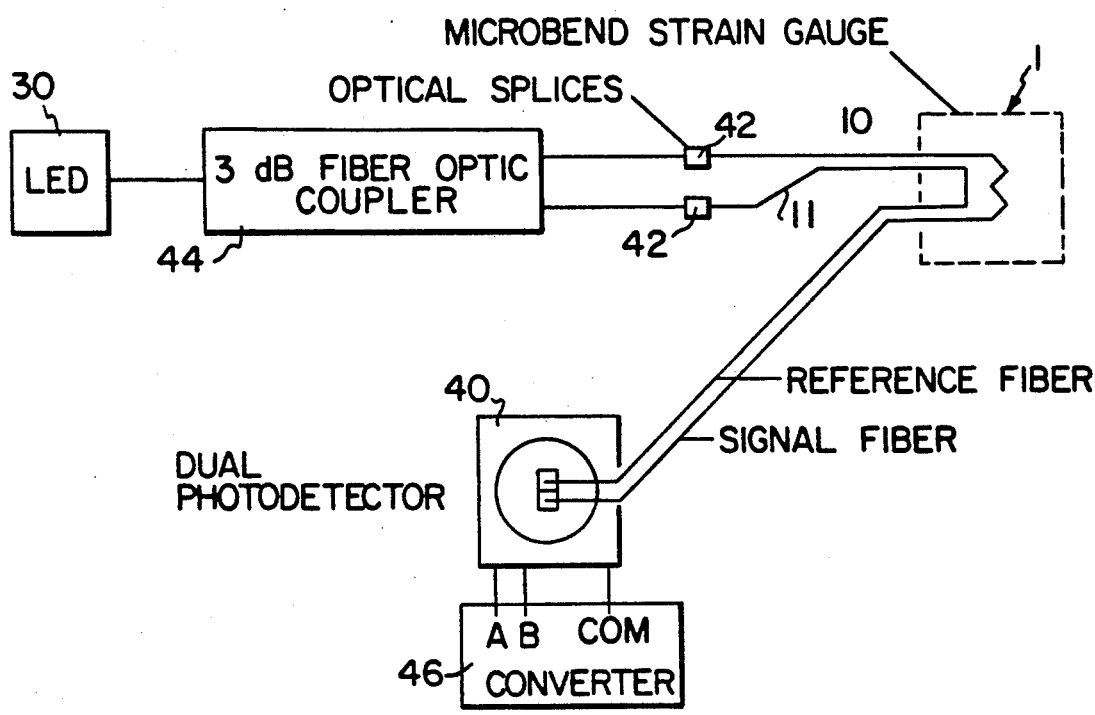
FIG. 2 is a block diagram showing the strain gauge of the present invention used with a reference fiber in addition to the signal fiber.

The microbend sensor uses inexpensive conventional opto-electronic components including a light emitting diode (LED), shown in FIG. 2 at 30, and silicon photodetector 40. By pulsing the LED and using CMOS integrated circuits to detect and amplify the photodetector signal, an average electronic power drain of less than 12 milliwatts per sensor has been demonstrated.

As described previously and shown in FIG. 1, the microbend sensor may be preloaded by bias displacement of the plates so that the corrugations 16, 18 overlap by an amount greater than or equal to the fiber diameter or maximum expected elongation. When the plates are heated, the corrugation peak separation with temperature may be calculated. It is also straightforward to show that for each plate the change in peak-to-peak corrugation spacing with temperature has a negligible effect on the sensor output signal. It is anticipated in practice that the microbend corrugated plates can be properly aligned so that the corrugation peaks are within 13 um of the desired preloaded displacement of approximately 300 um. In this case, the worst thermally induced elongation ($\Delta L$)$_T$ caused by positioning error is given by:

$$(\Delta L)_T = L \alpha \Delta T$$

Substituting for $\Delta T$ the required thermal operating range of 400° C., for $\alpha$ a value of $8.5 \times 10^{-6}/°$ C. for a typical titanium alloy, and for L the position error of 13 $\mu$m, the thermally induced elongation error is:

$$(\Delta L) = (13)(8.5 \times 10^{-6})(400) = 0.04 \ \mu m.$$

Thus, for a gauge length, i.e. length of optical fiber conductor 10, of 1 cm, the resulting thermally induced error is (4$\mu$) strain, where 1$\mu$ strain = 1 $\mu$m/m.

In addition to compensation of the thermo-mechanical offset just described, changes in optical fiber light transmission must be compensated as well as changes in light source intensity and drift of photodetector output sensitivity. The invention has successfully compensated these changes using the approach diagrammed in FIG. 2. As shown in FIG. 2, second optical fiber 11 (reference fiber) is co-located with the signal optical fiber 10 clamped between the corrugated plates (not shown in FIG. 2). The reference optical fiber 11 is unclamped, but sees the same thermal environment along its length as the signal fiber.

In a conventional strain gauge there is a mismatch between the coefficient of expansion of the strain sensing element and the test article. An output strain then results at temperatures above or below the installation temperature due to differential thermal expansion. This differential thermal expansion results in the loss of a portion of the useful measuring range of the strain gauge. A major advantage of the subject invention is that the microbend strain gauge allows the matching of the thermal expansion coefficient of the plates 12 and 14 with that of the substrate material to be tested.

Figure 4:
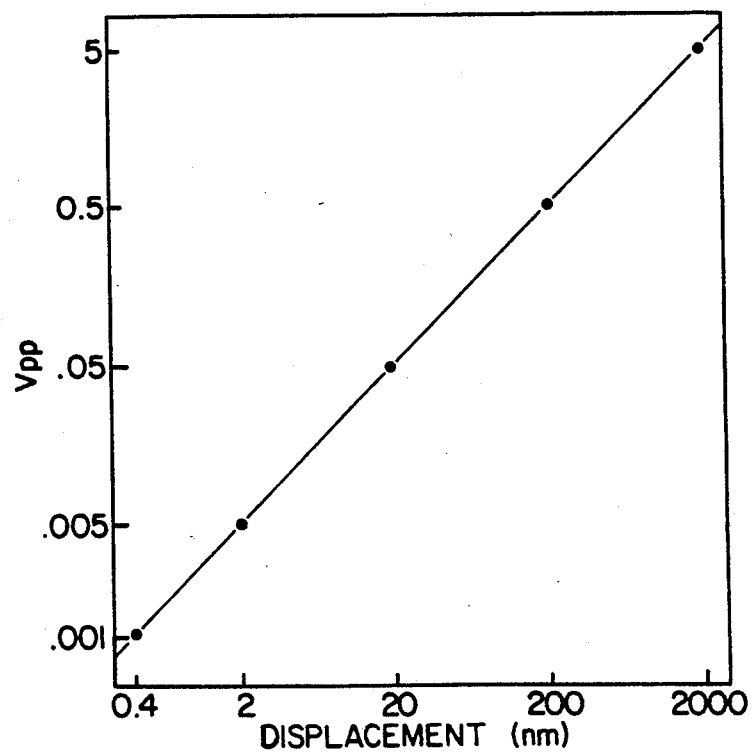
FIG. 4 is a graph plotting the strain gauge output voltage versus displacement of the plates in the strain gauge.

The test data shown in FIGS. 3–5 were obtained using stainless steel plates. In general, the plate material would be chosen to match the thermal expansion coefficient of the underlying material. In some circumstances the predominant strain direction and sign are known in advance and the plate material may be selected to deliberately induce a thermal offset in the gauge output at the operating temperatures, thus increasing the useful range of the gauge in the direction of measurement without decreasing the gauge sensitivity. In conventional strain gauges, the mismatch is not readily controlled and thus may be either favorable or unfavorable.

Plates 12 and 14 can also be made of fused silica or other similar ceramics to increase resistance to thermal effects such as thermal degrading of the plates and the thermal expansion and contraction effect.

The advantages of the microbend fiber optic gauge of the invention are listed as follows:

Operating temperatures above 427° C. (800° F.);

Lightweight, compact and non-obtrusive, especially if the structural member is slotted to accept the corrugated microbend sensor plates;

Accuracy of 0.005 μm at frequencies from D. C. to 20 kHz;

The microbend sensor may be mechanically and electronically compensated with temperature, and electronics signal processing may be used to eliminate drift;

Compatible with composite and metallic materials, this requirement being met by making the corrugated microbend sensor plates from material identical to the strut material or test piece;

Immune to electromagnetic interference and electromagnetic pulse;

Since the sensor uses non-polarized light energy to operate, spark hazards are non-existent, and remote mounted sensors are locatable in explosion hazard environments; and Inert glass optical fiber material is resistant to corrosion.

To increase the useful range of the present invention up to about 540° C. (about 1,000° F.), a gold coated SiO₂ optical fiber can be utilized in place of the aluminum or polyimide coated glass fiber. Both signal fiber 10 and reference fiber 11 can be constructed in this way. A strain gauge according to the invention and having this temperature resistance can be useful for long-term measurements of creep strains on reheat or main steam lines in boilers.

Field installation of such gauges would be by capacitive discharge spot welding, thus requiring only local descaling and grinding for surface preparation. Insulation which is normally used over pipes to be outfitted with the inventive strain gauge need only be removed in the immediate area of the gauge. A plug of insulation which is, for example, two to three inches in diameter, could be removed, the gauge installed, and the plug replaced. The optical fiber leads would be brought out through the insulation at the plug for connection to extension fibers and strain readout equipment.

Returning now to FIG. 2, both signal and reference fibers 10 and 11 are connected through known optical splices 42 to a fiber optic coupler 44.

The light output for LED 30 is slit into two parts by the three dB coupler 44, and the now split output is coupled through splicers 42 to the signal fiber 10 and the reference fiber 11. These multimode optical fibers then supply their signals to the dual photodector 40 and its associated output circuitry 46. Photovoltaic signals A and B, representing the modulation of the light moving through the signal and refence fibers 10 and 11 respectively, are digitized and converted in converter circuit 46 to form values $(A-B)/(A+B)$ for the compensated sensor signal.

While specific embodiments of the invention have been shown and described in detail to illustrate the application of the principles of the invention, it will be understood that the invention may be embodied otherwise without departing from such principles.

What is claimed is:

1. A strain gauge operable in hostile environments comprising:

a pair of plates made of a material having a temperature expansion coefficient dissimilar to that of a material to be tested for the purpose of increasing the range of the sensor and having facing and offsetting corrugated surfaces and wherein at least one plate is attached to the material to be tested;

a buffer coated first optical signal fiber clamped between the corrugations of the plates for being bent to a greater or lessor extent depending on pressure exerted on the plates for moving the plates together;

a buffer coated reference optical signal fiber located in the vicinity of the plates so as to be simultaneously exposed to the same thermal and other conditions along its length as the first optical fiber;

optical signal applying means including a light source and light splitting means connected to one end of each optical fiber for simultaneously applying an optical signal to both optical fibers; and optical detector means connected to the opposite ends of both optical fibers for measuring the modulations in the optical signal transmitted through the first optical fiber which modulations correspond to pressures applied to the plates and for reading the modulations in the optical signal transmitted through the reference optical fiber.

2. A strain gauge according to claim 1, wherein said signal and reference fibers have a glass core and cladding and an aluminum coating.

3. A strain gauge according to claim 1, wherein said signal and reference fibers have a glass core and cladding and a polyimide coating.

4. A strain gauge according to claim 1, wherein said signal and reference fibers have a core of SiO₂, and a coating of gold.

* * * * *